March 25, 1930.  C. M. DIBBLE  1,751,726
BROILER
Filed Sept. 26, 1927   2 Sheets-Sheet 1

March 25, 1930.  C. M. DIBBLE  1,751,726
BROILER
Filed Sept. 26, 1927  2 Sheets-Sheet 2
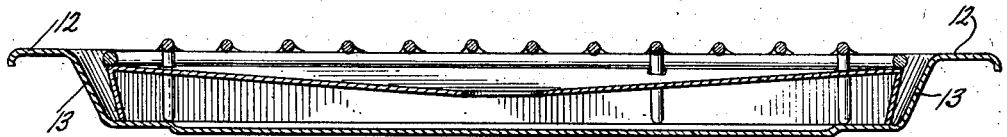
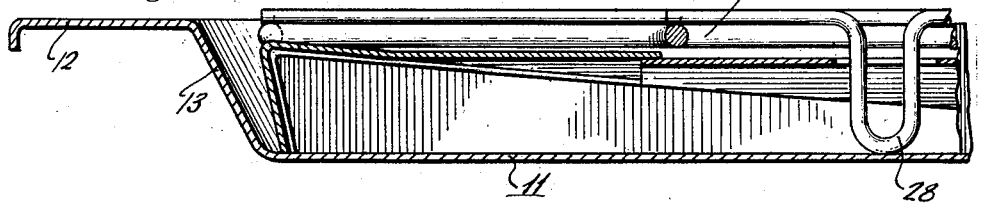
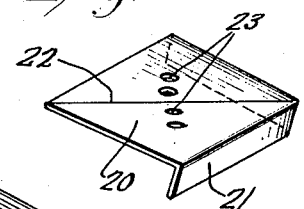
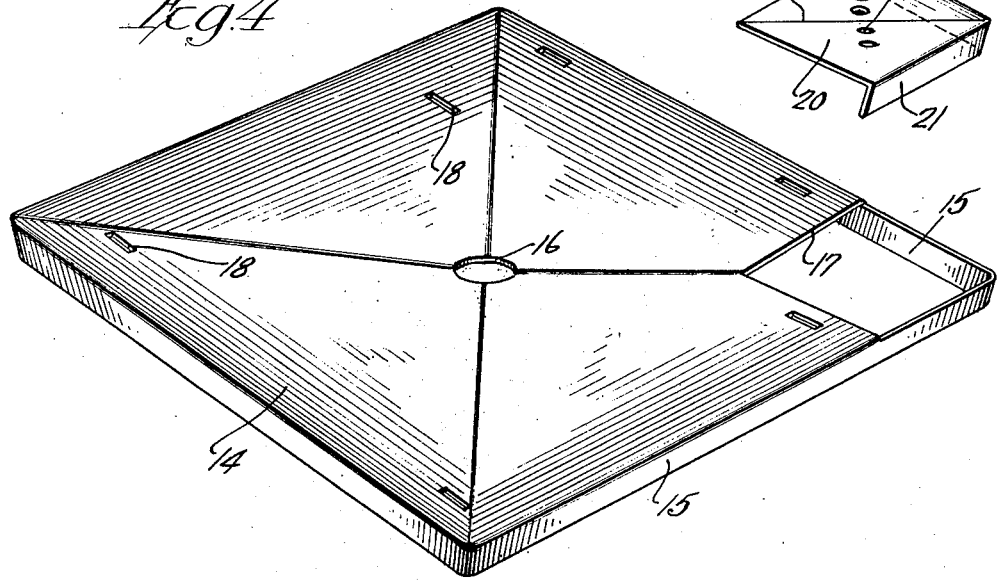

Patented Mar. 25, 1930

1,751,726

UNITED STATES PATENT OFFICE

CLAUDE M. DIBBLE, OF JOLIET, ILLINOIS, ASSIGNOR TO MOORE BROTHERS COMPANY, OF JOLIET, ILLINOIS, A CORPORATION OF ILLINOIS

BROILER

Application filed September 26, 1927. Serial No. 222,033.

This invention relates in general to a cooking tray or broiler for cook stoves and to the provision of a simple grid and drip pan construction in which the grid is not entirely supported by the drip pan.

An important object of the invention is the provision of slots in the drip pan through which supports for the grid extend independently to engage the bottom of the broiler tray.

Another important object of the invention is the provision of a drip pan with a basting opening and cover and with a corresponding recess in the grid, making is unnecessary to raise either the grid or the drip pan in withdrawing liquid from the broiler tray or for basting purposes.

Numerous other objects and advantages of the invention will be apparent as it is better understood from the following description, which, taken in connection with the accompanying drawings, discloses a preferred embodiment thereof.

In the drawings:

Fig. 2 is a cross-section taken on the line 2—2 of Fig. 1;

Fig. 3 is a detail section taken on the line 3—3 of Fig. 1;

Fig. 4 is a perspective of the drip pan showing the basting opening; and

Fig. 5 is a perspective of the cover for the basting opening.

Figure 1:
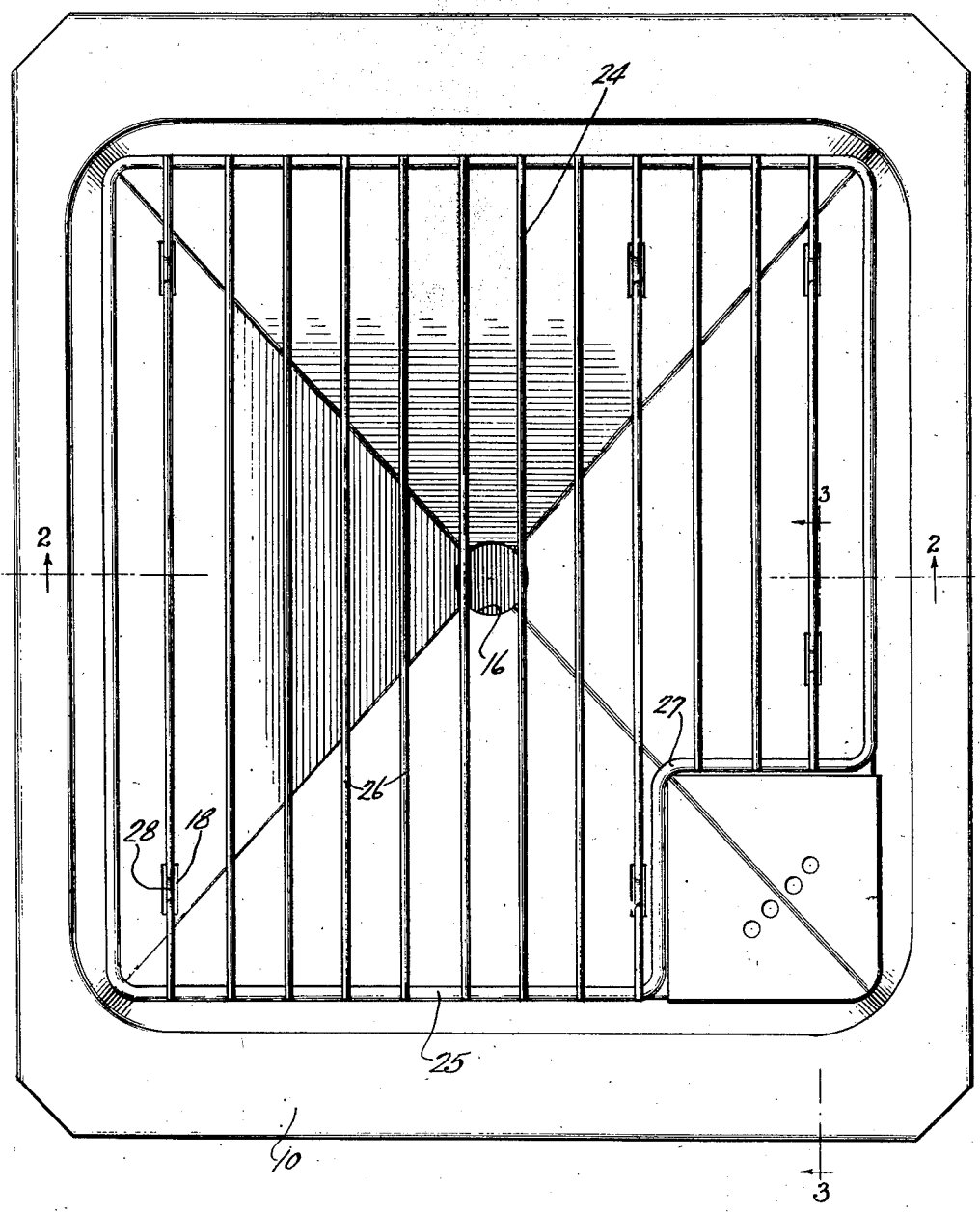
Figure 1 is a plan view of a broiling tray with a grid and a drip tray therein constructed in accordance with the principles of this invention.

In a broiler for a cook stove it is customary to provide a tray slidable in the broiling compartment and to have in the tray either a grid or a drip pan, or both, so that the grease and other liquid which drips from the meat will be caught in the bottom of the tray. It is frequently desirable to baste the meat or other material being cooked with the liquid in the bottom of the tray and if this meat is resting upon the grid or drip pan they must be raised with the meat in order to have access to the liquid in the broiler tray.

The present invention overcomes this by providing a grid with a recessed corner and a drip pan with an aperture corresponding to the recess in the grid, so that liquid in the tray below the drip pan may be removed through the opening in the pan and used for basting, or entirely withdrawn, without raising either the grid and the pan or the meat supported thereby in so doing.

Referring more particularly to the drawings: the numeral 10 designates a broiler tray with a depressed bottom 11 having side flanges 12 connected with the bottom by sides 13 which incline inwardly and downwardly toward the bottom 11.

A drip pan 14 preferably formed of sheet metal has a depending flange 15 also inclined inwardly and downwardly toward the bottom 11 of the tray, but at a somewhat steeper angle than the tray sides 13, permitting the flange 15 to rest on the tray bottom and yet providing sufficient clearance between the tray sides and the drip pan flange to allow easy lifting of the drip pan out of the tray.

The top drip surface of the pan inclines from each of the four side edges toward the central opening 16 so that the drippings caught on the pan will flow down the inclined surfaces thereof and pass on to the tray bottom through the central opening 16. This construction protects the drippings from the meat from being overheated by the flame above the broiler, prevents them from catching fire, or smoking, and burning the meat or the gravy. At one corner of the pan is a basting aperture 17 formed by simply cutting out a portion of the top of the pan but leaving the flange 15 intact at the corner thereof. The pan is also provided with a plurality of rectangular slots or openings 18 through which may be inserted the hereinafter described supporting means for the grid 24.

In order to close the basting aperture 17 a cover 20 is provided slightly larger than the opening with a depending flange 21 on two sides conforming to the flange 15 at the corner of the pan 14 and with an inclined surface 22 conforming to the inclination of the upper surface of the drip pan. In this cover are a number of small holes 23 for the insertion of a pointed instrument, such for example as a fork, to raise the cover from the pan without burning the hands. The edges of the cover are adapted to overlap the corresponding edges of the pan.

Disposed on top of the drip pan 14 is a grid 24 comprising a marginal member or wire 25 and a number of spaced metal bars 26 parallel to each other and to opposite sides of the margin wire 25. One corner 27 of the margin wire is turned inwardly to uncover a space at the corner of the drip pan slightly larger than the basting opening 17 therein, so that the cover 20 may be applied freely thereto without engaging the margin wire or the grid 24. The margin wire is of a suitable size to rest upon the outermost edge of the drip pan directly over the supporting flange thereof except the inturned corner 27 which is not thus supported. The cross bars 26 are secured to the margin wire at the ends by soldering or welding and intermediate their ends some of these bars are formed with U-shaped projections 28 which extend through the slots 18 in the drip pan below. These projections are rounded at the bottom and are of such a height that they engage the bottom of the broiling tray and form an additional support for the grid itself independent of the drip pan 14, so that no severe strain is placed upon the pan, particularly upon the interior dripping surface.

In the cooking operation, drippings from meat on the grid pass freely therethrough and in contact with the drip surface of the pan 14, whereupon the drippings will flow down the inclined upper surfaces into the opening 16 at the center and into the broiling tray below. The opening 16 is spaced from the bottom of the tray 11, so that there is no danger of it becoming clogged unless the tray becomes too full. To remove the liquid from the broiling tray, the basting cover 20 is simply lifted and the liquid is ladled therefrom as desired.

It is thought that this invention and many of its attendant advantages will be understood from the foregoing description, and it will be apparent that many changes may be made in the form, construction and arrangement of the parts without departing from the spirit and scope of the invention or sacrificing all of its material advantages, the form hereinbefore described being merely a preferred embodiment thereof.

I claim:

1. In a broiler, a tray, a drip pan resting upon the tray and having openings therethrough, and a grid above the pan and having projections through the openings of the pan for supporting it from the tray.

2. In a broiler, a tray, a drip pan supported in the tray at a distance above the bottom thereof, and a grid disposed above the drip pan and having projections from the bottom thereof adapted to extend through the pan and independently support the grid from the bottom of the tray.

3. In a broiler, a carrying tray, a drip pan having a depending marginal flange for supporting it in the bottom of the tray and elongated openings through the pan, and a grid comprising a marginal member and cross bars connected to the marginal member, said cross bars having projections formed out of the material of the bars and extending downwardly from the under side of the grid, the projections being inserted through the openings to support the grid from the bottom of the tray.

4. In a broiler, a drip pan, and a grid adapted to be placed thereover, the drip pan having a basting opening adjacent one edge thereof, and the grid having a recessed portion which does not extend over the basting opening in the drip pan, thereby allowing free access to the opening.

5. In a broiler, a drip pan and a grid therefor, the pan having a basting opening adjacent one edge, and the grid having an inwardly turned portion which leaves the basting opening uncovered, and a removable cover for the basting opening.

6. In a broiler, a supporting tray with a depressed interior portion, a drip pan having a depending flange resting upon the bottom of said portion and having also an interior drip opening, the drip pan also being provided with a basting opening adjacent the edge thereof, and a grid disposed above the drip pan having an inwardly turned portion which does not extend over the basting opening, and a removable cover for the basting opening.

7. In a broiler, the combination with a tray having a central depression of a drip pan fitting therein, having a depending outer flange which rests about the edge of the depressed portion of the tray, and with a dripping opening and upper surfaces inclined thereto, a marginal portion of the pan being formed with a basting opening and other openings through the inclined surfaces of the pan, a grid comprising a marginal member turned inwardly at one portion thereof to avoid the basting opening and cross bars attached to the marginal member and having projections extending through the said other openings of the pan and resting upon the bottom of the tray, and a removable cover for the basting opening which is unobstructed by the grid on top of the pan.

8. In a broiler, a tray having a depressed central part, a drip pan supported above the depressed portion of said tray and said drip pan having a basting opening at its side to facilitate the removal of juices of broiling for basting.

9. A broiler, comprising a tray, a drip pan having a depending flanged edge upon which it is supported in the bottom of the tray, a grid resting about the edge of the pan, and means independent of the drip pan for supporting a grid on the bottom of the tray.

10. In a broiler, the combination of a tray, a drip pan supported on said tray, and a grid resting on the edge of the drip pan, said grid comprising a marginal member with cross pieces connected at the ends to said marginal member, and projections from the cross pieces extending downwardly to support the grid independently of the drip pan at a distance above the bottom of the tray.

11. In a broiler, a supported tray having side flanges and a depressed central portion joined thereto by inclined sides, a drip pan having a flanged margin upon which it is supported on the tray, a central portion of the pan having a drip opening spaced from the bottom of the tray with inclined surfaces leading thereto, a grid having a marginal member resting upon the margin of the drip pan and cross bars secured at their ends to opposite sides of the marginal member, some of the cross bars having U-shaped extensions adapted to rest on the bottom of the tray for supporting the grid on the tray independently of the drip pan.

12. The combination with a tray having an interior depression, of a combined grid and drip pan formed of a sheet metal stamping and having a depending marginal flange fitting within the depression of the tray, one edge of the pan having a basting recess adjacent the flange and a cover for the basting recess having a retaining flange fitting between the flange of the pan and the adjacent edge of the depression of the tray.

CLAUDE M. DIBBLE.